US012632878B2

(12) United States Patent
Hiwatashi et al.

(10) Patent No.: US 12,632,878 B2
(45) Date of Patent: May 19, 2026

(54) VEHICLE

(71) Applicant: SUBARU CORPORATION, Tokyo (JP)

(72) Inventors: Yutaka Hiwatashi, Tokyo (JP); Tomohiro Morita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/684,139

(22) PCT Filed: Sep. 1, 2022

(86) PCT No.: PCT/JP2022/033022
§ 371 (c)(1),
(2) Date: Feb. 15, 2024

(87) PCT Pub. No.: WO2024/047850
PCT Pub. Date: Mar. 7, 2024

(65) Prior Publication Data
US 2025/0191015 A1 Jun. 12, 2025

(51) Int. Cl.
*G06Q 30/0207* (2023.01)
*B60W 40/08* (2012.01)
*B60W 50/02* (2012.01)
*G06Q 10/20* (2023.01)

(52) U.S. Cl.
CPC ......... *G06Q 30/0207* (2013.01); *B60W 40/08* (2013.01); *B60W 50/0205* (2013.01); *G06Q 10/20* (2013.01); *B60W 2040/0809* (2013.01); *B60W 2540/043* (2020.02)

(58) Field of Classification Search
None
See application file for complete search history.

(56) References Cited

U.S. PATENT DOCUMENTS

| | | | | |
|---|---|---|---|---|
| 2009/0063283 A1* | 3/2009 | Kusumoto | ............. | G06Q 30/02 |
| | | | | 705/14.25 |
| 2014/0278907 A1* | 9/2014 | Paruchuri | .......... | G06Q 30/0239 |
| | | | | 705/14.39 |
| 2018/0293595 A1* | 10/2018 | McMaster | .......... | G01C 21/3626 |
| 2019/0135176 A1* | 5/2019 | Miki | ........................ | B60Q 9/00 |
| 2019/0306779 A1* | 10/2019 | Iwamoto | ............... | H04W 48/18 |
| 2020/0104881 A1 | 4/2020 | Yasui et al. | | |
| 2020/0160393 A1* | 5/2020 | Otsuka | ............... | G01C 21/3667 |

FOREIGN PATENT DOCUMENTS

| | | |
|---|---|---|
| JP | 2016-49947 A | 4/2016 |
| WO | 2018/230704 A1 | 12/2018 |

OTHER PUBLICATIONS

International Search Report issued in International Application No. PCT/JP2022/033022 dated Oct. 11, 2022, in Japanese.

* cited by examiner

*Primary Examiner* — Allan J Woodworth, II
(74) *Attorney, Agent, or Firm* — TROUTMAN PEPPER LOCKE LLP

(57) ABSTRACT

A vehicle includes: an information provider configured to provide predetermined provision information obtained by the vehicle; an incentive acquirer configured to acquire an incentive that relates to decoration of the vehicle and is determined in response to provision of the provision information; and an incentive giver configured to give the incentive acquired by the incentive acquirer.

20 Claims, 9 Drawing Sheets

| ORNAMENT | ORNAMENT NAME | GIVING CONDITION |
|---|---|---|
| | LOVE PARK | NUMBER OF VISITS TO NATIONAL PARK: 5 OR MORE |
| | ADVENTURE | NUMBER OF TIMES OF PROVISION OF MAP CREATION ASSIST INFORMATION: 10 OR MORE<br>DISTANCE OF PROVIDED ROAD: 10 km OR MORE<br>AREA OF CREATED MAP: 50000 m$^2$ OR MORE |
| | MOUNTAIN BIKE | MOUNTAIN BIKE ON BOARD<br>NUMBER OF VISITS TO BICYCLE SHOP: 10 OR MORE |
| | ROAD TRIP | NUMBER OF TYPES OF NATIONAL ROADS TRAVELED: 20 OR MORE |
| | COMMUNITY | NUMBER OF TIMES OF PARTICIPATION TO PREDETERMINED COMMUNITY: 5 OR MORE |
| | MILITARY | HAVING ENTRY EXPERIENCE IN MILITARY |
| | DONATION | DONATION: 100 DOLLARS OR MORE, OR NUMBER OF DONATIONS: 3 OR MORE |
| | MARATHON | NUMBER OF TIMES OF MARATHON COMPLETION: 1 OR MORE |
| | ANIMAL | ANIMAL ON BOARD |
| | BIKE | BIKE ON BOARD |
| | FAMILY | FAMILY ON BOARD |
| | GUITAR | GUITAR ON BOARD |
| | TRAIN | NUMBER OF VISITS TO STATION: 10 OR MORE |
| | CAMP | NUMBER OF VISITS TO CAMP SITE: 3 OR MORE |

FIG. 9

| SOUND EFFECT | GIVING CONDITION |
|---|---|
| ENGINE SOUND | NUMBER OF VISITS TO CIRCUIT: 5 OR MORE |
| NATURAL SOUND | NUMBER OF VISITS TO NATIONAL PARK: 5 OR MORE |
| GUITAR SOUND | GUITAR ON BOARD |

VEHICLE

CROSS REFERENCE TO RELATED APPLICATION

The present application is a U.S. National Phase Application under 35 U.S.C. § 371 of International Patent Application No. PCT/JP2022/033022 filed Sep. 1, 2022. The entire contents of which are hereby incorporated by reference.

FIELD OF THE INVENTION

The present invention relates to a vehicle.

BACKGROUND

In related art, a system has been proposed in which, when diagnosis information relating to a malfunction of a vehicle is transmitted to a center server, an evaluation value is given to a user based on the transmitted diagnosis information (for example, see Japanese Unexamined Patent Application Publication No. 2016-049947).

SUMMARY

In the above-described system, the evaluation value can be exchanged with a new dress, hairstyle, background, or the like of an avatar in a SNS. However, since there is no incentive for the vehicle even though information obtained by the vehicle is provided, motivation to provide the information obtained by the vehicle may decrease.

Therefore, an object of the present invention is to increase motivation to provide information obtained by a vehicle.

A vehicle according to an embodiment of the present invention includes an information provider configured to provide provision information including at least a detection result detected by a sensor provided in the vehicle or information calculated based on the detection result; an incentive acquirer configured to acquire an incentive that relates to decoration of the vehicle and is determined in response to provision of the provision information; and an incentive giver configured to give the incentive acquired by the incentive acquirer.

A vehicle according to an embodiment of the present invention includes an information provider configured to provide predetermined provision information obtained by the vehicle; a lifestyle information acquirer configured to acquire lifestyle information relating to a lifestyle of a user; an incentive acquirer configured to acquire an incentive that relates to decoration of the vehicle and is determined based on the lifestyle information in response to provision of the provision information; and an incentive giver configured to give the incentive acquired by the incentive acquirer.

A vehicle according to an embodiment of the present invention includes an information provider configured to provide predetermined provision information obtained by the vehicle; an incentive acquirer configured to acquire an incentive that relates to decoration of the vehicle and is determined in response to provision of the provision information; and an incentive giver configured to give the incentive acquired by the incentive acquirer. The incentive giver is configured to give the incentive based on a selection by a user or a predetermined priority from among the incentive that can be acquired.

A vehicle according to an embodiment of the present invention includes an information provider configured to provide provision information including one or more of information relating to malfunction diagnosis of the vehicle and information relating to a route along which the vehicle has traveled; an incentive acquirer configured to acquire an incentive that relates to decoration of the vehicle and is determined in response to provision of the provision information; and an incentive giver configured to give the incentive acquired by the incentive acquirer.

A vehicle according to an embodiment of the present invention includes an information provider configured to provide predetermined provision information obtained by the vehicle; a user identifier configured to identify a user; an incentive acquirer configured to acquire an incentive that relates to decoration of the vehicle and is determined in response to provision of the provision information; and an incentive giver configured to give the incentive acquired by the incentive acquirer. The incentive acquirer is configured to acquire the incentive associated with the user identified by the user identifier.

According to the present invention, the motivation to provide the information obtained by vehicle can be increased.

BRIEF DESCRIPTION OF DRAWINGS

FIG. 4 is a view illustrating another example of the exterior display.

FIG. 8 is a table presenting examples of an ornament.

FIG. 9 is a table presenting examples of a sound effect.

DETAILED DESCRIPTION

Figure 1:
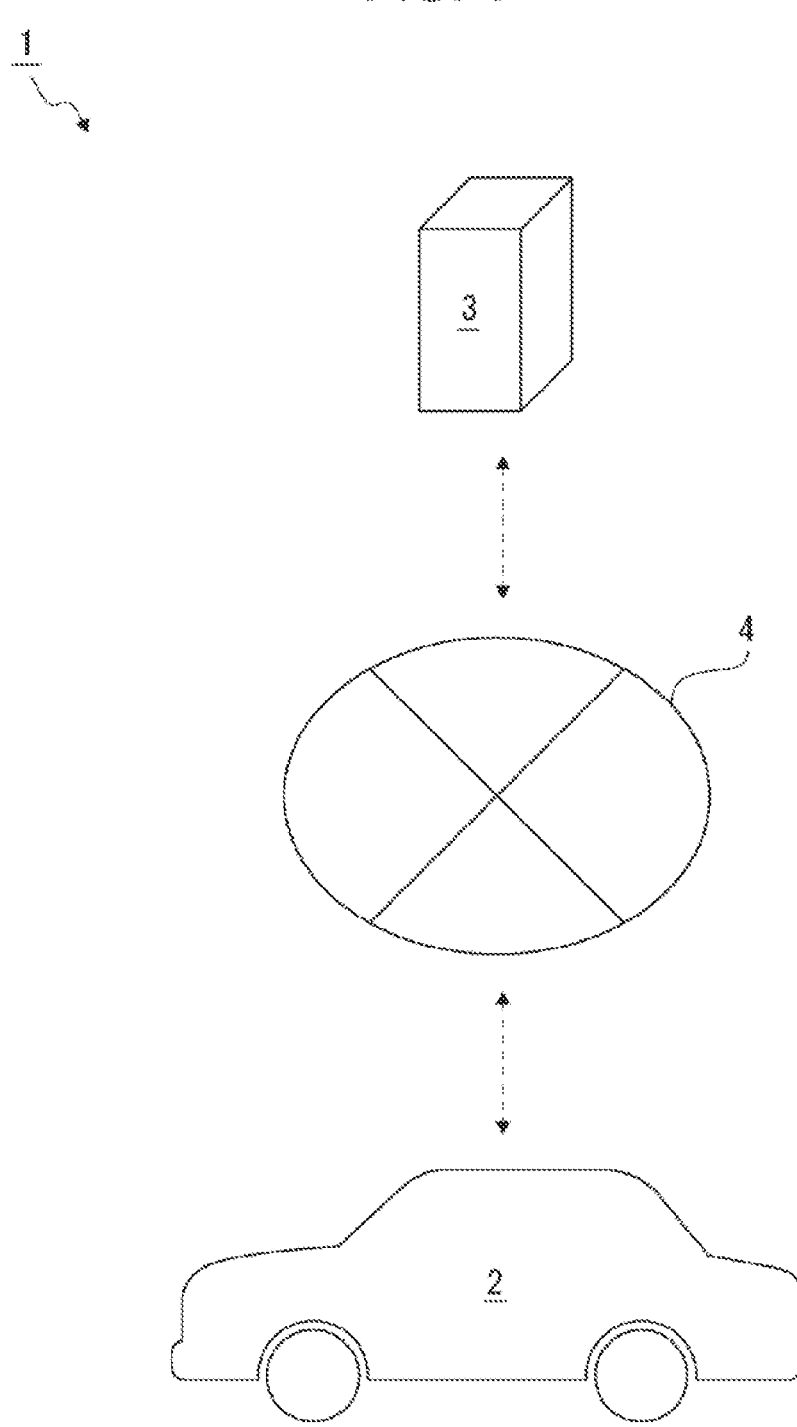
FIG. 1 is a diagram illustrating a configuration of an incentive giving system.

FIG. 1 is a diagram illustrating a configuration of an incentive giving system 1. As illustrated in FIG. 1, the incentive giving system 1 includes a vehicle 2 and a server device 3. The vehicle 2 and the server device 3 can be connected with each other via a network 4. Various networks are expected as examples of the network 4, such as a cellular phone line network, a mobile communication network, a satellite communication network, the Internet, an intranet, and an extranet.

In the incentive giving system 1, as will be described in detail later, when predetermined provision information obtained by the vehicle 2 is provided from the vehicle 2 to the server device 3, an incentive relating to decoration of the vehicle 2 is given from the server device 3 to the vehicle 2 in response to the provision of the provision information. Then, in the vehicle 2, decoration corresponding to the given incentive is performed.

Figure 2:
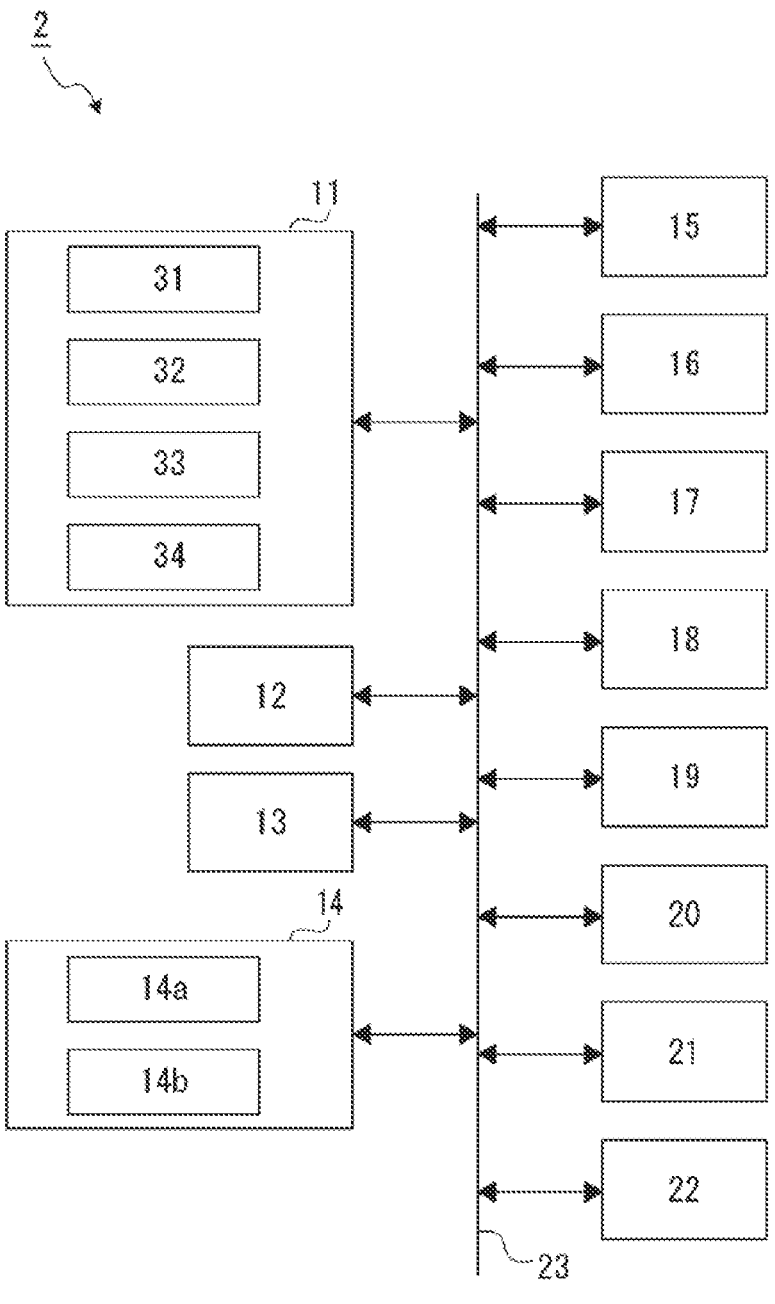
FIG. 2 is a diagram illustrating a configuration of a vehicle.

FIG. 2 is a diagram illustrating a configuration of the vehicle 2. The vehicle 2 is, for example, an automobile including one or both of an engine and a motor as a power source.

As illustrated in FIG. 2, the vehicle 2 includes a controller 11, a memory 12, an input unit 13, a display 14, a sound output unit 15, a sensor unit 16, an exterior environment recognizer 17, an interior environment recognizer 18, an on-board malfunction diagnostic device 19, a navigation device 20, a driver monitor system 21, and a communication unit 22.

In the vehicle 2, the controller 11, the memory 12, the input unit 13, the display 14, the sound output unit 15, the sensor unit 16, the exterior environment recognizer 17, the interior environment recognizer 18, the on-board malfunction diagnostic device 19, the navigation device 20, the driver monitor system 21, and the communication unit 22 are coupled to each other via a bus 23. Control signals, data, and the like to be used are transmitted and received among the components.

The controller 11 is constituted by a computer including a central processing unit (CPU), a read only memory (ROM), and a random access memory (RAM). The controller 11 controls the entire vehicle 2 by causing the CPU to execute various types of processing in accordance with a program read from the ROM or the memory 12 and loaded into the RAM.

The controller 11 includes functional units as an information provider 31, a lifestyle information acquirer 32, an incentive acquirer 33, and an incentive giver 34. These functional units will be described in detail later.

The memory 12 is constituted by a hard disk drive (HDD), a flash memory, or the like. The memory 12 stores a program for implementing processing of the present embodiment. The memory 12 stores information for the processing of the present embodiment, such as map information, malfunction diagnosis information, map creation assist information, and data of an incentive.

The input unit 13 is a device such as a touch panel or a button that can be operated by a user. When an operation by the user is detected by the input unit 13, a signal corresponding to the input operation is input to the controller 11.

The display 14 includes an interior display 14a that displays an image mainly for an occupant in the vehicle and an exterior display 14b that displays an image mainly for the outside of the vehicle.

The interior display 14a is, for example, a liquid crystal display (LCD) or an organic electro-luminescence (EL) display, and displays various images (screens) based on an instruction of the controller 11. The interior display 14a displays various operation menus, icons, messages, and the like, that is, performs displaying as a graphical user interface (GUI) based on an instruction of the controller 11.

Figure 3:
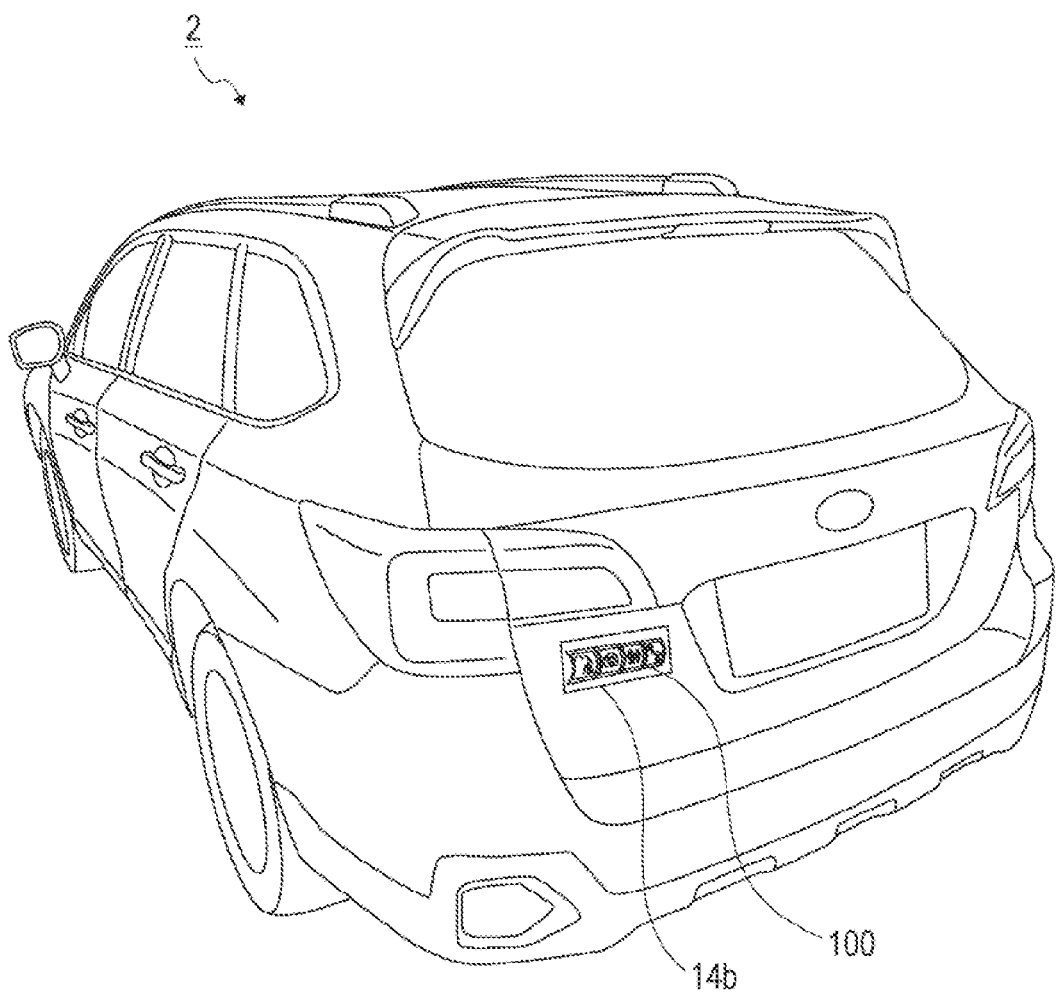
FIG. 3 is a diagram illustrating an example of an exterior display.
Figure 4:
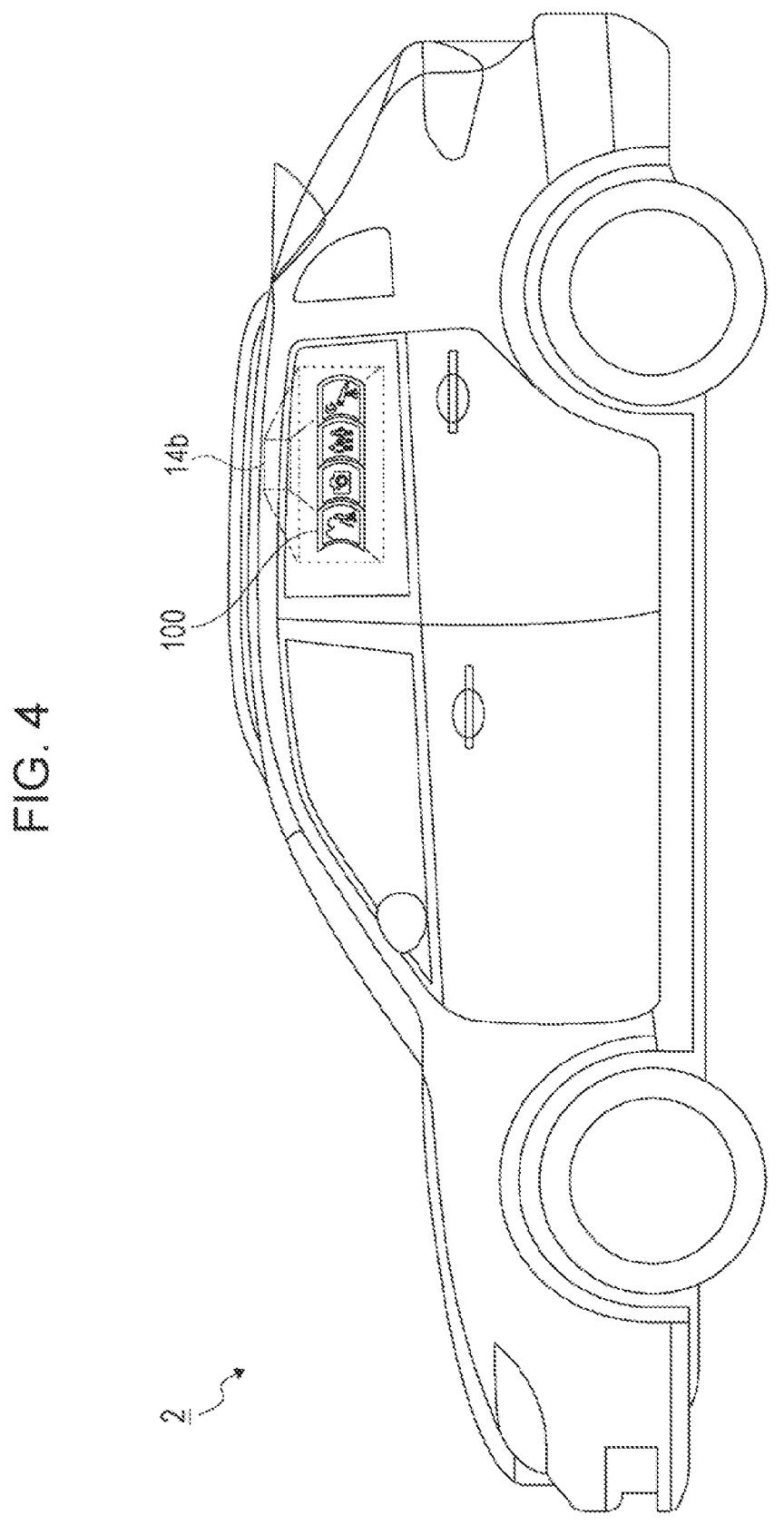

FIGS. 3 and 4 are views illustrating examples of the exterior display 14b. As illustrated in FIG. 3, an example of the exterior display 14b is a LCD or an organic electro-luminescence (EL) display provided at a rear end portion of the vehicle 2, for example, an upper portion of a rear bumper.

As illustrated in FIG. 4, another example of the exterior display 14b is a projector device provided in the vehicle, and projects an image on, for example, a rear side window.

In this way, the exterior display 14b displays an image mainly toward the outside of the vehicle. The exterior display 14b can display, for example, up to four ornaments 100, which will be described in detail later, based on an instruction of the controller 11. The number of ornaments 100 that can be displayed on the exterior display 14b may be any number.

The sound output unit 15 includes a speaker, an amplifier, and the like, and outputs various sounds based on an instruction from the controller 11. The sound output unit 15 is desirably capable of outputting a sound toward the inside of the vehicle, and is desirably capable of outputting a vehicle approach sound or the like, which notifies the outside of the vehicle that the vehicle 2 is approaching, toward the outside of the vehicle.

The sensor unit 16 comprehensively represents various sensors provided in the vehicle 2. The sensor unit 16 includes, for example, a vehicle speed sensor, a wheel speed sensor, an engine rotational speed sensor, an accelerator opening degree sensor, a brake sensor, a steering angle sensor, a yaw rate sensor, a G sensor, and a global navigation satellite system (GNSS) sensor. These sensors are merely examples, and some of these sensors may not be provided, or a sensor other than these sensors may be provided.

The vehicle speed sensor detects the speed of the vehicle 2. The wheel speed sensor detects the rotational speed of a wheel. The engine rotational speed sensor detects the rotational speed of an engine. The accelerator opening degree sensor detects the accelerator opening degree from the depression amount of an accelerator pedal. The brake sensor detects the brake operation amount from the depression amount of a brake pedal. The steering angle sensor detects the steering angle of a steering wheel. The yaw rate sensor detects the yaw rate applied to the vehicle 2. The G sensor detects the accelerations acting in a traveling direction, a vehicle width direction, and a vertical direction of the vehicle 2. The GNSS sensor detects the current position of the vehicle 2 based on a signal transmitted from an artificial satellite.

The exterior environment recognizer 17 includes a stereo camera that image-captures an area ahead of the vehicle 2 and a computer that performs image processing. In the exterior environment recognizer 17, the computer executes predetermined image processing relating to recognition of an exterior environment based on image data obtained by the stereo camera capturing an image in the traveling direction of the vehicle 2.

The exterior environment recognizer 17 performs, for example, the following processing as image processing based on image data obtained by stereo image capturing. First, the exterior environment recognizer 17 generates distance information for each pixel based on the principle of triangulation using the amount of deviation (parallax) between corresponding positions in a pair of captured images as image data. Then, the exterior environment recognizer 17 performs known grouping processing on the distance information, and compares the distance information subjected to the grouping processing with three-dimensional road shape data, object data, and the like stored in advance. Accordingly, the exterior environment recognizer 17 recognizes a division line, a road marking, a guard rail present along a road, a side wall such as a curb, an object such as a vehicle, a stop line, a traffic light, a railroad crossing, a pedestrian crossing, a lane, and the like.

The exterior environment recognizer 17 can recognize a surrounding object based on the image data, and can also recognize the behavior of the object. For example, the exterior environment recognizer 17 can also recognize the position, the speed, the acceleration, a change of the traveling direction, the lighting state of a direction indicator, and the like of a preceding vehicle with respect to the vehicle 2. The lighting state of the direction indicator indicates whether the direction indicator is in a lighting state, a blinking state, or an off state.

When a preset object is recognized among the recognized objects, the exterior environment recognizer 17 causes the memory 12 to store exterior environment information indicating the recognized object.

The interior environment recognizer 18 includes a camera that image-captures the inside of the vehicle and a computer that performs image processing. The interior environment recognizer 18 recognizes an object in the vehicle and a feature (content) of the object by the computer performing predetermined image processing based on image data obtained by the camera capturing an image of the inside of the vehicle.

For example, the interior environment recognizer 18 recognizes a person, a pet, a musical instrument, a bicycle, or the like present in the vehicle.

When recognizing a person present in the vehicle, the interior environment recognizer 18 recognizes the sex and age of the person. When recognizing a pet, a musical instrument, or a bicycle present in the vehicle, the interior environment recognizer 18 recognizes the type of the pet, musical instrument, or bicycle.

The image processing in this case can be performed using an existing technique, and a detailed description thereof will be omitted.

Then, when recognizing a preset object, the interior environment recognizer 18 causes the memory 12 to store interior environment information indicating the recognized object and the feature (content) of the object.

The on-board malfunction diagnostic device (on board diagnostics, OBD) 19 includes a computer and diagnoses a malfunction of the vehicle 2 based on, for example, a detection result detected by the sensor unit 16. When finding a malfunction, the on-board malfunction diagnostic device 19 causes the memory 12 to store malfunction diagnosis information indicating the content of the malfunction.

The malfunction diagnosis information stored in this case is information for repairing the vehicle 2, and is useful information for creating a database constructed by accumulating malfunction information, for example, for each vehicle type.

The navigation device 20 includes a computer. The navigation device 20 displays, on the interior display 14a, a map image including the current position of the vehicle 2 calculated by the GNSS sensor based on the map information stored in the memory 12.

When receiving a destination input via the input unit 13, the navigation device 20 searches for a route to the destination and provides guidance on the searched route. For example, the navigation device 20 causes the interior display 14a to display the searched route to be superimposed on a map, or causes the sound output unit 15 to output a voice for guidance on the searched route.

The navigation device 20 searches for a place set as a destination, a place on a map visited by the vehicle 2, or the like, from the map information and causes the memory 12 to store the place or the like as destination information.

When the current position of the vehicle 2 is not on a road included in the map information, that is, when the vehicle 2 is not traveling on a road, the navigation device 20 causes the memory 12 to store the track of the current position of the vehicle 2 when the vehicle 2 is not traveling on a road as map creation assist information.

The map creation assist information stored in this case may indicate a road not registered in the map information, that is, a new road, and is useful information for creating a map.

The driver monitor system 21 includes a camera that image-captures a driver (user) and a computer that performs image processing. The driver monitor system 21 is a system that detects drowsiness, dozing off, inattentive driving, or the like of the driver by performing predetermined image processing on an image captured by the camera, and can also identify the driver. Thus, when identifying the driver, the driver monitor system 21 causes the memory 12 to store user identification information for identifying the driver.

The communication unit 22 performs communication processing via the network 4. The controller 11 performs various types of data communication with an external device connected with the network 4, for example, the server device 3, via the communication unit 22.

Figure 5:
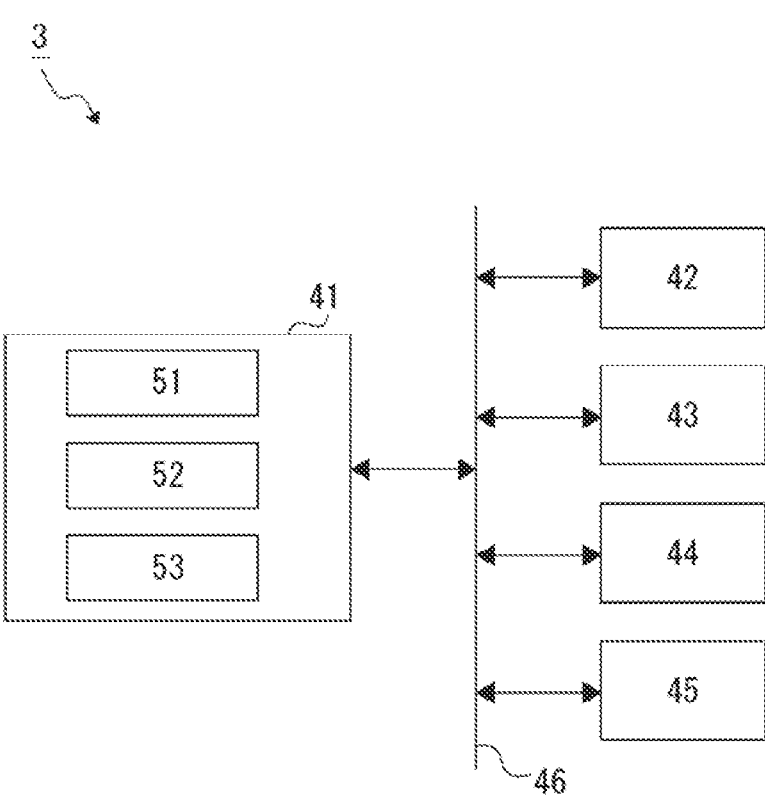
FIG. 5 is a diagram illustrating a configuration of a server device.

FIG. 5 is a diagram illustrating a configuration of the server device 3. As illustrated in FIG. 5, the server device 3 is a computer including a CPU 41, a ROM 42, a RAM 43, a memory 44, and a communication unit 45.

In the server device 3, the CPU 41, the ROM 42, the RAM 43, the memory 44, and the communication unit 45 are coupled to each other via a bus 46. Control signals, data, and the like to be used are transmitted and received among the units.

The CPU 41 executes various types of processing in accordance with a program read from the ROM 42 or the memory 44 and loaded into the RAM 43. The RAM 43 also stores data and the like for the CPU 41 to execute the various types of processing as appropriate.

The CPU 41 functions as an information acquirer 51, an evaluation unit 52, and an incentive determiner 53. These units will be described in detail later.

The memory 44 is constituted by a HDD, a flash memory, or the like. The memory 44 stores a program for implementing processing of the present embodiment. The memory 44 stores information transmitted from the vehicle 2, and also stores data of an incentive to be given to the vehicle 2.

Figure 6:
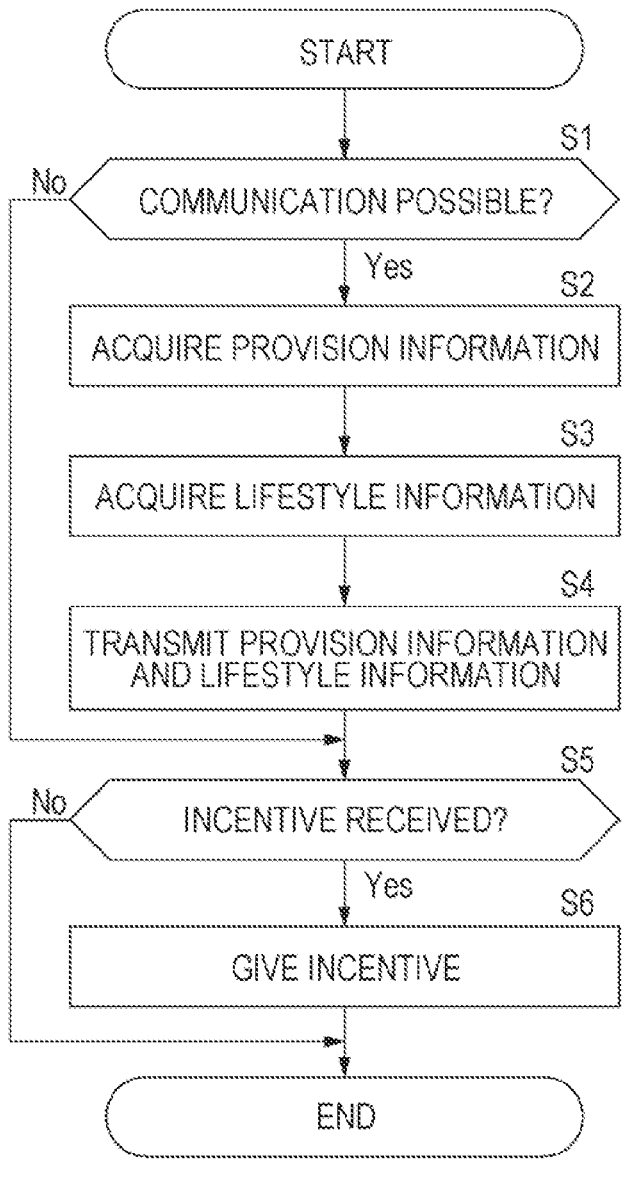
FIG. 6 is a flowchart presenting incentive giving processing in the vehicle.
Figure 7:
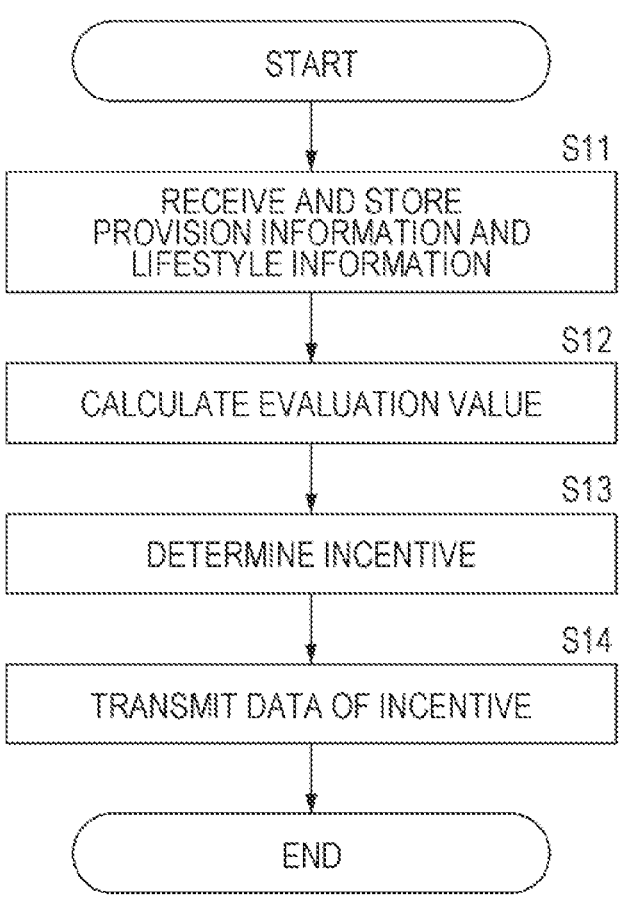
FIG. 7 is a flowchart presenting incentive giving processing in the server device.

Next, incentive giving processing performed by the incentive giving system 1 will be described. FIG. 6 is a flowchart of the incentive giving processing in the vehicle 2. FIG. 7 is a flowchart of the incentive giving processing in the server device 3.

When the incentive giving processing is started in the vehicle 2, as presented in FIG. 6, the controller 11 determines whether provision information can be transmitted to the server device 3. In the vehicle 2, for example, a situation in which communication via the communication unit 22 can be performed, a situation in which a battery of the vehicle 2 is being charged, or the like is set as a transmittable condition, and it is determined in this step whether the transmittable condition is satisfied.

When the transmission is possible (Yes in step S1), the information provider 31 acquires malfunction diagnosis information and map creation assist information stored in the memory 12 as provision information (step S2).

The lifestyle information acquirer 32 also acquires interior environment information, exterior environment information, destination information, and user input information as lifestyle information (step S3). The user input information is information relating to a lifestyle of a user (for example, a driver) and input by the user. For example, the user input information is input through an operation by the user on the input unit 13 or acquired via a smartphone.

It can be said that these items of information reflect the lifestyle of the user, such as a hobby, a life, and a purpose of the user.

The information provider 31 transmits the acquired provision information and lifestyle information to the server device 3 in association with the vehicle 2 (step S4). In this case, the communication unit 22 transmits the provision information and the lifestyle information in association with, for example, a unique ID of the vehicle 2.

In the server device 3, as presented in FIG. 7, when receiving the provision information and the lifestyle information, the information acquirer 51 causes the memory 44 to store the provision information and the lifestyle information in association with the unique ID of the vehicle 2 (step S11).

Then, the evaluation unit 52 gives points as an evaluation value in accordance with the provision information stored in the memory 44 (step S12). As a method of giving points, the number of times of malfunction diagnosis may be directly given as points, or points may be set for each content of malfunction diagnosis and points may be given in accordance with the malfunction content indicated in the malfunction diagnosis information.

Points may be given for each predetermined distance in accordance with the length of the track included in the map creation assist information.

Then, the incentive determiner 53 determines an ornament 100 or a sound effect to be given as an incentive based on the points given by the evaluation unit 52 and the acquired lifestyle information (step S13).

FIG. 8 is a table presenting examples of the ornament 100. As presented in FIG. 8, the ornament 100 is an image indicating a predetermined lifestyle, and an ornament name and a giving condition are set. The incentive determiner 53 determines the ornament 100 or the sound effect that matches the lifestyle of the user.

For example, an ornament "love park" is an ornament 100 to be given to a user who frequently visits a park. For the ornament "love park", a condition that the number of visits to a national park is 5 or more is set as a giving condition. The number of visits to a national park can be calculated from the destination information.

An ornament "adventure" is an ornament 100 to be given to a user who has provided information useful for creating a map, that is, a user having a high degree of contribution to map creation. For the ornament "adventure", one of a condition that the number of times of provision of map creation assist information is 10 or more, a condition that the length of a track (road) provided from map creation assist information is 10 km or more, and a condition that the area of a map created based on map creation assist information is 50000 m² or more is set as a giving condition.

An ornament "mountain bike" is an ornament 100 to be given to a user who likes a mountain bike. For the ornament "mountain bike", a condition that a mountain bike has ever been mounted on the vehicle 2 and a condition that the number of visits to a bicycle shop is 10 or more are set as giving conditions. Whether a mountain bike has ever been mounted on the vehicle 2 can be determined based on whether a mountain bike has been included in recognized objects included in the interior environment information. The number of visits to a bicycle shop can be calculated from the destination information.

An ornament "military" is an ornament 100 to be given to a user who has an entry experience in a military. For the ornament "military", a condition that a user has an entry experience in a military is set as a giving condition. It is possible to determine whether a user has an entry experience in a military by determining whether information indicating that the user has an entry experience in a military is included in the user input information.

As presented in FIG. 9, the sound effect is a sound effect output from the sound output unit 15, and a giving condition is set. For example, for a sound effect "engine sound", an engine sound is output from the sound output unit 15 as a vehicle approach sound or a start sound. For the sound effect "engine sound", a condition that the number of visits to a circuit is 5 or more is set as a giving condition. The number of visits to a circuit can be calculated from the destination information.

The incentive determiner 53 determines the number of incentives to be given in accordance with given points. For example, the incentive determiner 53 increases the number of incentives to be given every predetermined number of points (for example, every 10 points).

Points for giving an incentive may be set for each type of incentive. For example, points for giving an ornament 100 may be 10 points and points for giving a sound effect may be 20 points. Points for giving an ornament 100 may vary among ornaments 100.

Hereinafter, a case where an ornament 100 is given every predetermined number of points will be described. For example, when an ornament 100 is given every 10 points to the vehicle ID having 30 points, the incentive determiner 53 determines three ornaments 100 to be given.

At this time, the incentive determiner 53 first extracts ornaments 100 that satisfy giving conditions. Then, when the number of ornaments 100 satisfying the giving conditions is three or less, the incentive determiner 53 determines the ornaments 100 satisfying the giving conditions as the ornaments 100 to be given.

In contrast, when the number of ornaments 100 satisfying the giving conditions is more than three, the incentive determiner 53 determines three ornaments 100 to be given in accordance with priorities set in advance.

In this case, for example, a priority for giving an ornament 100 is set for each ornament 100, and the incentive determiner 53 determines three ornaments 100 having high priorities among the ornaments 100 satisfying the giving conditions as the ornaments 100 to be given.

Alternatively, when the number of ornaments 100 satisfying the giving conditions is more than three, the incentive determiner 53 may determine ornaments 100 selected by the user as the ornaments 100 to be given.

For example, the incentive determiner 53 transmits a list of ornaments 100 satisfying giving conditions to the vehicle 2 to display the list on the interior display 14a of the vehicle 2. In the vehicle 2, three ornaments 100 are selected from among the ornaments 100 indicated in the list through an operation by the user on the input unit 13. Then, information indicating the ornaments 100 selected through the operation by the user on the input unit 13 is transmitted from the vehicle 2 to the server device 3, and thus the incentive determiner 53 determines the three ornaments 100 selected by the user as the ornaments 100 to be given.

When the incentive determiner 53 determines the incentive (ornament 100) to be given, the incentive determiner 53 transmits data of the determined incentive to the vehicle 2 having the corresponding vehicle ID via the communication unit 45 (step s14).

In the vehicle 2, when the incentive acquirer 33 receives the data of the incentive (Yes in step S5), the incentive giver 34 causes the memory 12 to store the data of the incentive and gives the incentive based on the data (step S6). For example, when data of an ornament 100 is received, the incentive giver 34 causes the exterior display 14b to display the ornament 100 based on the data.

When data of a sound effect is received, the incentive giver 34 causes the sound output unit 15 to output the sound effect based on the data at a predetermined timing.

As described above, the number (in this case, four) of ornaments 100 that can be displayed on the exterior display 14b is determined in advance.

Thus, the incentive determiner 53 may determine the number of ornaments 100 that can be displayed on the exterior display 14b at the maximum.

The incentive determiner 53 determines the number of ornaments 100 in accordance with the points. When more ornaments 100 than the number of ornaments 100 that can be displayed on the exterior display 14b are determined, the incentive giver 34 may cause the user to select ornaments 100 to be displayed on the exterior display 14b from the determined ornaments 100. Alternatively, when more ornaments 100 than the number of ornaments 100 that can be displayed on the exterior display 14b are determined, the incentive giver 34 may switch the determined ornaments 100 to be displayed on the exterior display 14b.

In this way, in the vehicle 2, decoration corresponding to a lifestyle of a user can be performed in response to provision of information relating to the vehicle 2. Thus, in the vehicle 2, motivation to provide the information relating to the vehicle 2 can be increased and a sense of satisfaction can be given to the user.

In the first embodiment, the case where an incentive is given in association with each vehicle ID of the vehicle 2 has been described. In a second embodiment, a case where an incentive is given in association with a user ID of a driver (user) will be described. Hereinafter, the driver is simply referred to as a user.

As described above, the driver monitor system 21 can also identify the user, and when the user is identified, user identification information for identifying the user is stored in the memory 12.

In the vehicle 2, when the user identification information is acquired, the user identification information is transmitted to the server device 3 by the information provider 31. In the server device 3, the CPU 41 specifies the user ID based on the received user identification information.

In the server device 3, a unique user ID is assigned to each user, and provision information, lifestyle information, an evaluation value, user identification information, information on a given incentive, and the like are stored in the memory 44 in association with the user ID.

When the user ID cannot be specified, the information acquirer 51 notifies the vehicle 2 of a new unique user ID, causes the memory 44 to store the user ID in association with the user identification information.

In contrast, when the user ID can be specified, the incentive determiner 53 notifies the vehicle 2 of the specified user ID, and when an incentive associated with the user ID is present, the incentive determiner 53 transmits data of the incentive to the vehicle 2.

Accordingly, in the vehicle 2, the incentive giver 34 can give the incentive associated with the user ID based on the received data of the incentive.

In the vehicle 2, the information provider 31 transmits provision information and lifestyle information to the server device 3 in association with the user ID. In the server device 3, the information acquirer 51 causes the memory 44 to store the provision information and the lifestyle information in association with the user ID.

Accordingly, in the incentive giving system 1, provision information and lifestyle information can be accumulated for the same user who uses different vehicles 2, and an incentive can be shared between the different vehicles 2 used by the same user.

In the incentive giving system 1, for example, even when a plurality of users such as family members use the same vehicle 2, it is possible to cause each user who uses the same vehicle 2 to use a different incentive by managing an incentive for each user ID.

Although the embodiments according to the present invention have been described above, the present invention is not limited to the above-described examples, and can employ various configurations.

For example, in the above-described embodiments, the controller 11 of the vehicle 2 includes the functional units as the information provider 31, the lifestyle information acquirer 32, the incentive acquirer 33, and the incentive giver 34. However, these functional units may be included in another computer in the vehicle 2. Alternatively, these functional units may be included in the server device 3.

In the above-described embodiments, the CPU 41 of the server device 3 includes the functional units as the information acquirer 51, the evaluation unit 52, and the incentive determiner 53. However, these functional units may be included in the computer of the vehicle 2.

In the above-described embodiments, the ornament 100 and the sound effect are given as the incentives. However, the incentive may be other than the ornament 100 and the sound effect as long as the incentive relates to decoration of the vehicle 2.

In the above-described embodiments, the malfunction diagnosis information and the map creation assist information have been described as examples of the provision information, but the provision information is not limited thereto as long as the provision information is information obtained by the vehicle 2.

In the second embodiment described above, the user ID is set for each driver. However, the user ID may be set to any person as long as the person rides in the vehicle 2, and for example, the user ID may be set to a person who sits on an occupant seat.

In the above-described embodiments, the ornament 100 determined by the server device 3 is displayed on the exterior display 14b. However, when the user does not want to display the ornament 100, the ornament 100 may be hidden.

As described above, a vehicle 2 according to the embodiments includes an information provider 31 configured to provide predetermined provision information obtained by the vehicle 2; an incentive acquirer 33 configured to acquire an incentive relating to decoration of the vehicle 2, the incentive being determined in response to provision of the provision information; and an incentive giver 34 configured to give the incentive acquired by the incentive acquirer 33.

Accordingly, by the vehicle 2 providing the provision information obtained by the vehicle 2, the incentive relating to the decoration of the vehicle 2 can be given to a user. Thus, in the vehicle 2, motivation to provide information relating to the vehicle 2 can be increased and a sense of satisfaction can be given to the user.

The vehicle 2 includes a lifestyle information acquirer 32 configured to acquire lifestyle information relating to a lifestyle of a user, and the incentive acquirer 33 is configured to acquire the incentive determined based on the lifestyle information.

Accordingly, in the vehicle 2, decoration with the incentive corresponding to the lifestyle of the user can be performed.

The incentive giver 34 is configured to give the incentive based on a selection by a user or a predetermined priority from among the incentive that can be acquired.

Accordingly, in the vehicle 2, decoration desired by the user can be performed.

The provision information includes one or more of information relating to malfunction diagnosis of the vehicle 2 and information relating to a route along which the vehicle 2 has traveled.

Accordingly, in the server device 3, for example, information relating to a malfunction for each type of vehicle can be accumulated, and useful information for future maintenance and vehicle development can be collected.

In the server device 3, information relating to a road not registered in a map can be accumulated, and information useful for map creation can be collected.

The vehicle 2 includes a user identifier (driver monitor system 21) configured to identify a user, and the incentive acquirer 33 is configured to acquire the incentive associated with the user identified by the user identifier.

Accordingly, provision information and lifestyle information can be accumulated for a user who uses different vehicles 2, and an incentive can be given to the user.

The invention claimed is:

1. A vehicle comprising:

an exterior display configured to display an image toward an outside of the vehicle;

a sound output unit comprising a speaker configured to output sound;

one or more processors; and one or more memories storing instructions causing the one or more processors to:

receive a detection signal from one or more sensors of the vehicle;

receive malfunction diagnosis information from an on-board malfunction diagnostic device of the vehicle, the on-board malfunction diagnostic device being configured to diagnose a malfunction of the vehicle based on the detection signal;

detect one or more operating parameters of the vehicle based on the detection signal and generate a detection result;

determine, based on a signal from a navigation device of the vehicle, whether a current position of the vehicle is on a road included in map information stored in the one or more memories;

in response to determining that the current position of the vehicle is not on a road included in the map information, generate map creation assist information including a track of the current position of the vehicle;

transmit provision information including at least the detection result or information calculated based on the detection result, the malfunction diagnosis information, and the map creation assist information to a server device, the server device being configured to (i) accumulate the malfunction diagnosis information for creating a database of malfunction information for each vehicle type, (ii) accumulate the map creation assist information for creating map information; and (iii) accumulate the provision information for multiple vehicles comprising the vehicle;

receive an incentive relating to one of an ornament configured to decorate the vehicle or sound to be output from the sound output unit, the incentive being associated with a lifestyle of a user of the vehicle and determined in response to the provision of the provision information;

in response to receiving the incentive, perform at least one of:

display the ornament on the exterior display toward the outside of the vehicle, or output the sound via the sound output unit wherein the ornament is an image indicating a predetermined lifestyle of the user of the vehicle, wherein a number of ornaments that can be displayed on the exterior display toward the outside of the vehicle is predetermined, and wherein when more ornaments than the predetermined number of ornaments that can be displayed on the exterior display are determined, the one or more processors are configured to switch the ornaments to be displayed on the exterior display toward the outside of the vehicle.

2. A vehicle comprising:

an exterior display configured to display an image toward an outside of the vehicle;

a sound output unit comprising a speaker configured to output sound;

one or more processors; and one or more memories storing instructions causing the one or more processors to:

receive a detection signal from one or more sensors of the vehicle;

receive malfunction diagnosis information from an on-board malfunction diagnostic device of the vehicle, the on-board malfunction diagnostic device being configured to diagnose a malfunction of the vehicle based on the detection signal;

detect one or more operating parameters of the vehicle based on the detection signal and generate predetermined provision information;

determine, based on a signal from a navigation device of the vehicle, whether a current position of the vehicle is on a road included in map information stored in the one or more memories;

in response to determining that the current position of the vehicle is not on a road included in the map information, generate map creation assist information including a track of the current position of the vehicle;

acquire lifestyle information relating to a lifestyle of a user of the vehicle based on the detection signal;

transmit the predetermined provision information, the lifestyle information, the malfunction diagnosis information, and the map creation assist information to a server device, the server device being configured to (i) accumulate the malfunction diagnosis information for creating a database of malfunction information for each vehicle type, (ii) accumulate the map creation assist information for creating map information; and (iii) accumulate the predetermined provision information and the lifestyle information for multiple vehicles comprising the vehicle;

receive an incentive relating to one of an ornament configured to decorate the vehicle or sound to be output from the sound output unit, the incentive being associated with a lifestyle of a user of the vehicle and determined in response to the provision of the predetermined provision information;

in response to receiving the incentive, perform at least one of:

display the ornament on the exterior display toward the outside of the vehicle, or output the sound via the sound output unit wherein the ornament is an image indicating a predetermined lifestyle of the user of the vehicle, wherein a number of ornaments that can be displayed on the exterior display toward the outside of the vehicle is predetermined, and wherein when more ornaments than the predetermined number of ornaments that can be displayed on the exterior display are determined, the one or more processors are configured to switch the ornaments to be displayed on the exterior display toward the outside of the vehicle.

3. A vehicle comprising:

an exterior display configured to display an image toward an outside of the vehicle;

a sound output unit comprising a speaker configured to output sound;

one or more processors; and one or more memories storing instructions causing the one or more processors to:

receive a detection signal from one or more sensors of the vehicle;

receive malfunction diagnosis information from an on-board malfunction diagnostic device of the vehicle, the on-board malfunction diagnostic device being configured to diagnose a malfunction of the vehicle based on the detection signal;

detect one or more operating parameters of the vehicle based on the detection signal and generate predetermined provision information;

determine, based on a signal from a navigation device of the vehicle, whether a current position of the vehicle is on a road included in map information stored in the one or more memories;

in response to determining that the current position of the vehicle is not on a road included in the map information, generate map creation assist information including a track of the current position of the vehicle;

transmit the predetermined provision information, the malfunction diagnosis information, and the map creation assist information to a server device, the server device being configured to (i) accumulate the malfunction diagnosis information for creating a database of malfunction information for each vehicle type, (ii) accumulate the map creation assist information for creating map information; and (iii) accumulate the predetermined provision information for multiple vehicles comprising the vehicle;

receive an incentive relating to one of an ornament configured to decorate the vehicle or sound to be output from the sound output unit, the incentive being associated with a lifestyle of a user of the vehicle and determined in response to the provision of the predetermined provision information;

in response to receiving the incentive, perform at least one of:

display the ornament on the exterior display toward the outside of the vehicle, or output the sound via the sound output unit, wherein the ornament is an image indicating a predetermined lifestyle of the user of the vehicle, wherein a number of ornaments that can be displayed on the exterior display toward the outside of the vehicle is predetermined, wherein when more ornaments than the predetermined number of ornaments that can be displayed on the exterior display are determined, the one or more processors are configured to switch the ornaments to be displayed on the exterior display toward the outside of the vehicle, and wherein the incentive is transmitted to the vehicle based on a selection by a user of the vehicle or a predetermined priority from among the incentives that can be transmitted to and received at the vehicle.

4. A vehicle comprising:

an exterior display configured to display an image toward an outside of the vehicle;

a sound output unit comprising a speaker configured to output sound;

one or more processors; and one or more memories storing instructions causing the one or more processors to:

receive a detection signal from one or more sensors of the vehicle;

receive malfunction diagnosis information from an on-board malfunction diagnostic device of the vehicle, the on-board malfunction diagnostic device being configured to diagnose a malfunction of the vehicle based on the detection signal;

detect one or more operating parameters of the vehicle based on the detection signal and generate provision information, the provision information being related to malfunction diagnosis of the vehicle and a route along which the vehicle has traveled;

determine, based on a signal from a navigation device of the vehicle, whether a current position of the vehicle is on a road included in map information stored in the one or more memories;

in response to determining that the current position of the vehicle is not on a road included in the map information, generate map creation assist information including a track of the current position of the vehicle;

transmit the provision information, the malfunction diagnosis information, and the map creation assist information to a server device, the server device being configured to (i) accumulate the malfunction diagnosis information for creating a database of malfunction information for each vehicle type, (ii) accumulate the map creation assist information for creating map information; and (iii) accumulate the provision information for multiple vehicles comprising the vehicle;

receive an incentive relating to-one of an ornament configured to decorate the vehicle or sound to be output from the sound output unit, the incentive being associated with a lifestyle of a user of the vehicle and determined in response to the provision of the provision information;

in response to receiving the incentive, perform at least one of:

display the ornament on the exterior display toward the outside of the vehicle, or output the sound via the sound output unit wherein the ornament is an image indicating a predetermined lifestyle of the user of the vehicle, wherein a number of ornaments that can be displayed on the exterior display toward the outside of the vehicle is predetermined, and wherein when more ornaments than the predetermined number of ornaments that can be displayed on the exterior display are determined, the one or more processors are configured to switch the ornaments to be displayed on the exterior display toward the outside of the vehicle.

5. A vehicle comprising:

an exterior display configured to display an image toward an outside of the vehicle;

a sound output unit comprising a speaker configured to output sound;

one or more processors; and one or more memories storing instructions causing the one or more processors to:

receive a detection signal from one or more sensors of the vehicle;

receive malfunction diagnosis information from an on-board malfunction diagnostic device of the vehicle, the on-board malfunction diagnostic device being configured to diagnose a malfunction of the vehicle based on the detection signal;

detect one or more operating parameters of the vehicle based on the detection signal and generate predetermined provision information;

determine, based on a signal from a navigation device of the vehicle, whether a current position of the vehicle is on a road included in map information stored in the one or more memories;

in response to determining that the current position of the vehicle is not on a road included in the map information, generate map creation assist information including a track of the current position of the vehicle;

identify a user based on the detection signal;

transmit the predetermined provision information, information associated with the identified user, the malfunction diagnosis information, and the map creation assist information to a server device, the server device being configured to (i) accumulate the malfunction diagnosis information for creating a database of malfunction information for each vehicle type, (ii) accumulate the map creation assist information for creating map information; and (iii) accumulate the predetermined provision information and information associated with the identified user for multiple vehicles comprising the vehicle;

receive an incentive relating to one of an ornament configured to decorate the vehicle or sound to be output from the sound output unit, the incentive being associated with a lifestyle of the user of the vehicle and determined in response to the provision of the predetermined provision information and the information associated with the identified user;

in response to receiving the incentive, perform at least one of:

display the ornament on the exterior display toward the outside of the vehicle, or output the sound via the sound output unit wherein the ornament is an image indicating a predetermined lifestyle of the user of the vehicle, wherein a number of ornaments that can be displayed on the exterior display toward the outside of the vehicle is predetermined, and wherein when more ornaments than the predetermined number of ornaments that can be displayed on the exterior display are determined, the one or more processors are configured to switch the ornaments to be displayed on the exterior display toward the outside of the vehicle.

6. The vehicle according to claim 1, wherein the one or more processors are configured to transmit the provision information when a predetermined condition is satisfied.

7. The vehicle according to claim 1, wherein the ornament or the sound is determined based on the provision information.

8. The vehicle according to claim 1, wherein the ornament or the sound is determined based on the provision information and predetermined conditions, and the ornament comprises one or more images indicating a predetermined lifestyle of a user of the vehicle.

9. The vehicle according to claim 2, wherein the one or more processors are further configured to transmit the predetermined provision information and the lifestyle information when a predetermined condition is satisfied.

10. The vehicle according to claim 2, wherein the ornament or the sound is determined based on the predetermined provision information and the lifestyle information, the lifestyle information comprises at least one of interior environment information of the vehicle, exterior environment information of the vehicle, destination information of the vehicle, or user input information.

11. The vehicle according to claim 2, wherein the ornament or the sound is determined based on the predetermined provision information, the lifestyle information, and predetermined conditions, and the ornament comprises one or more images indicating a predetermined lifestyle of a user of the vehicle.

12. The vehicle according to claim 3, wherein the one or more processors are configured to transmit the predetermined provision information when a predetermined condition is satisfied.

13. The vehicle according to claim 3, wherein the ornament or the sound is determined based on the predetermined provision information.

14. The vehicle according to claim 3, wherein the ornament or the sound is determined based on the predetermined provision information and predetermined conditions, and the ornament comprises one or more images indicating a predetermined lifestyle of a user of the vehicle.

15. The vehicle according to claim 4, wherein the one or more processors are configured to transmit the provision information when a predetermined condition is satisfied.

16. The vehicle according to claim 4, wherein the ornament or the sound is determined based on the provision information.

17. The vehicle according to claim 4, wherein the ornament or the sound is determined based on the provision information and predetermined conditions, and the ornament comprises one or more images indicating a predetermined lifestyle of a user of the vehicle.

18. The vehicle according to claim 5, wherein the one or more processors are configured to transmit the predetermined provision information and the information associated with the identified user when a predetermined condition is satisfied.

19. The vehicle according to claim 5, wherein the ornament or the sound is determined based on the predetermined provision information and the information associated with the identified user.

20. The vehicle according to claim 5, wherein the ornament or the sound is determined based on the predetermined provision information, the information associated with the identified user, and predetermined conditions, and the ornament comprises one or more images indicating a predetermined lifestyle of a user of the vehicle.

* * * * *